US007847825B2

(12) United States Patent
Aoki et al.

(10) Patent No.: US 7,847,825 B2
(45) Date of Patent: Dec. 7, 2010

(54) IMAGE CAPTURING APPARATUS

(75) Inventors: Katsuji Aoki, Nara (JP); Katsuhiro Kanamori, Nara (JP)

(73) Assignee: Panasonic Corporation, Osaka (JP)

( * ) Notice: Subject to any disclaimer, the term of this patent is extended or adjusted under 35 U.S.C. 154(b) by 1465 days.

(21) Appl. No.: 11/240,357

(22) Filed: Oct. 3, 2005

(65) Prior Publication Data
US 2006/0038915 A1    Feb. 23, 2006

Related U.S. Application Data

(63) Continuation of application No. PCT/JP2004/006071, filed on Apr. 27, 2004.

(30) Foreign Application Priority Data

May 29, 2003  (JP) .............................. 2003-152531

(51) Int. Cl.
  *H04N 5/232* (2006.01)
  *H04N 5/222* (2006.01)
(52) U.S. Cl. ................. 348/211.4; 348/211.5; 348/370; 348/371
(58) Field of Classification Search ................. 348/143, 348/144, 145, 152, 153, 156, 157, 159, 162, 348/163, 164, 166, 207.99, 211.99, 211.1, 348/211.2, 211.4, 211.5, 211.6, 218.1, 226.1, 348/227.1, 228.1, 370, 371; 396/322, 324, 396/325, 332, 333, 334
See application file for complete search history.

(56) References Cited

U.S. PATENT DOCUMENTS 6,262,767 B1 * 7/2001 Wakui ................... 348/211.99

6,950,546 B2 * 9/2005 Chang et al. ................. 382/141
7,046,292 B2 * 5/2006 Ziemkowski ................. 348/371
2005/0117045 A1 * 6/2005 Abdellatif et al. ........... 348/335

FOREIGN PATENT DOCUMENTS

| JP | 7-264465   | 10/1995 |
| JP | 8-88796    | 4/1996  |
| JP | 9-37141    | 2/1997  |
| JP | 2000-341719| 12/2000 |

* cited by examiner

*Primary Examiner*—David L Ometz
*Assistant Examiner*—Peter Chon
(74) *Attorney, Agent, or Firm*—Wenderoth, Lind & Ponack, L.L.P.

(57) ABSTRACT

An image capturing apparatus (107-1) which captures an image of an object moving in a space where a light source (109) is placed, the light source emitting light whose intensity varies in a predetermined cycle, the imaging capturing apparatus includes: an imaging device (102-1) for capturing the image of the object and the light from the light source (109); a signal processing unit (103-1) for generating, from a signal outputted from the imaging device (102-1), an image signal that includes a picture sequence synchronized with an imaging apparatus drive signal obtained from the outside; and a phase difference detection unit (105-1), a phase different adjustment unit (106-1), and a drive signal generation unit (104-1), for generating a signal that is synchronized with the intensity variations of the light from the light source (109) which is captured by the imaging device (102-1), and outputting, as the imaging-apparatus drive signal, the generated signal into the signal processing unit (103-1).

8 Claims, 12 Drawing Sheets

IMAGE CAPTURING APPARATUS

CROSS REFERENCE TO RELATED APPLICATION

This is a continuation of PCT Application No. PCT/JP2004/006071, filed on Apr. 27th, 2004.

TECHNICAL FIELD

The present invention relates to an image capturing apparatus, and more especially to a technology for capturing, with synchronized timing, the same object by using a plurality of the image capturing apparatuses.

BACKGROUND ART

In order to measure a position, a distance, and the like regarding a moving object such as a vehicle, a robot, or an animal, there are various technologies, one of which uses a plurality of image capturing apparatuses to capture images of the object from different angles with synchronized timing. The above technology can measure, for example, a distance from the object to each image capturing apparatus by triangulation using a focal length of each imaging apparatus lens and a parameter such as a distance between the image capturing apparatuses. The above-mentioned "to capture with synchronized timing" means that a picture obtained by a first image capturing apparatus and another picture obtained by a second image capturing apparatus are captured (sampled) with exact coincidence in time.

One such technology for the synchronized capturing by a plurality of image capturing apparatuses is disclosed in Japanese Patent Laid-Open No. 2000-341719 publication to provide a stereo camera.

FIG. 1 is a diagram showing a structure of the conventional stereo cameras.

Referring to FIG. 1, lenses 701-1 and 701-2 focus respective collected light. Imaging devices 702-1 and 702-2 convert the light focused by the lenses 701-1 and 701-2 into respective electrical signals. Signal processing units 703-1 and 703-2 convert, into respective image signals, the electrical signals which are outputted from the imaging devices 702-1 and 702-2. A drive signal generation unit 704 generates a drive signal for driving both of the imaging devices 702-1 and 702-2, and both of the signal processing units 703-1 and 703-2. An imaging apparatus 705-1 includes the lens 701-1, the imaging device 702-1, the signal processing unit 703-1, and the drive signal generation unit 704. An imaging apparatus 705-2 includes the lens 701-2, the imaging device 702-2, and the signal processing unit 703-2. An image processing unit 706 processes images from both of the image signals which are outputted from the imaging apparatuses 705-1 and 705-2.

Here, in the imaging apparatuses 705-1 and 705-2, the light focused by the lenses 701-1 and 701-2 are converted into electrical signals by the imaging devices 702-1 and 702-2 which are driven by the drive signal generated by the drive signal generation unit 704. The electrical signals converted by the imaging devices 702-1 and 702-2 are converted into the image signals by the signal processing units 703-1 and 703-2 which are driven by the drive signal generated by the drive signal generation unit 704. The image signals converted by the signal processing units 703-1 and 703-2 are inputted into the image processing unit 706 which processes images from both of the image signals.

According to the conventional technology, in the imaging apparatuses 705-1 and 705-2, the drive signal which is generated by the same drive signal generation unit 704 is used to drive both of the imaging devices 702-1 and 702-2 and both of the signal processing units 703-1 and 703-2, so that the imaging apparatuses 705-1 and 705-2 can capture images of the same object with synchronized timing.

However, in such a conventional technology, it is necessary to establish signal lines for supplying the drive signal generated by the drive signal generation unit to the respective imaging apparatuses, for example, if there are Q imaging apparatuses (Q is a whole number), it is necessary to establish Q signal lines for supplying the synchronizing signal and the drive signal to these imaging apparatuses, so that the greater a distance between the imaging apparatuses is, the longer the signal line is required to be, which results in problems of increased cost and installation load. Especially in a case that a plurality of imaging apparatuses are installed in a large space, for example, in order to capture images of a football player in a football stadium, it is necessary to connect the respective imaging apparatuses to be supplied with the synchronizing signal and the drive signal, which causes a significant cost and extra cable installation work.

DISCLOSURE OF INVENTION

In view of the above problems, it is an object of the present invention to provide an image capturing apparatus having the synchronized capturing function which has lower cost and lower installation load as compared to the conventional image capturing apparatus.

In order to achieve the above object, an image capturing apparatus according to the present invention adjusts, into a phase of an intensity variation in a time period regarding light emitted from a light source, a phase of the drive signal for driving the signal processing unit that converts the electronic signal, which has been converted and outputted by the imaging device, into the image signal to be outputted. Thereby, a plurality of the imaging apparatuses can capture images of an object with synchronized timing, so that it is not necessary to establish the signal line for supplying the drive signal to the respective imaging apparatuses in which the drive signal is outputted by a single drive signal generation unit shared among the plurality of imaging apparatuses, which enables the image capturing apparatus to achieve lower cost and lower installation load as compared to the conventional image capturing apparatus.

More specifically, the image capturing apparatus according to the present invention which captures an image of an object moving in a space where a light source is placed, the light source emitting light whose intensity varies in a predetermined cycle, the image capturing apparatus includes: a light source detection unit operable to detect the light which is emitted from the light source, and to convert the detected light into an electrical signal; a drive signal generation unit operable to generate a signal which is synchronized with the electrical signal outputted from the light source detection unit, and to output the generated signal as a drive signal; an imaging unit operable to capture the image of the object; and a signal processing unit operable to generate, from a signal outputted from the imaging unit, an image signal which includes a picture sequence that is synchronized with the drive signal. Accordingly, a plurality of the image capturing apparatuses capture images of the object in synchronization with the intensity variations of the light which is emitted from one and the same light source, so that the plurality of image capturing apparatuses can capture images of the object with synchronized timing, without using cables or the like.

Here, in order to enable the plurality of image capturing apparatuses to capture the images with exact coincidence in time, the drive signal generation unit may include: a phase difference detection unit operable to detect a phase difference between the electrical signal outputted from the light source detection unit and the drive signal; and a phase adjustment unit operable to adjust a phase of the drive signal in order to modify the detected phase difference to be a predetermined value, for example. Here, the drive signal generation unit may be operable to generate a signal whose cycle is one K-th, where K is a whole number, of a cycle of the intensity variation of the light emitted from the light source, and to output the generated signal as the drive signal. Alternatively, the light source detection unit may be operable to accumulate, per cycle of the drive signal, the light emitted from the light source, and to output, per cycle of the drive signal, the electrical signal having a level proportional to an degree of the accumulated light intensity, and the drive signal generation unit may include a maximum amplitude detection unit operable to adjust a phase of the drive signal in order to maximize an amplitude of the electrical signal outputted from the light source detection unit.

Note that the light source detection unit and the imaging unit may share an imaging sensor. Accordingly, it is not necessary to install a special sensor for detecting the intensity variations of the light which is emitted from the light source.

Furthermore, the light source detection unit is an imaging device in which a plurality of photo-detecting elements are two-dimensionally arranged, and the image capturing apparatus may further include a light source region setting unit operable to set, as a light source region, a region among the photo-detecting elements, the region including at least one of the photo-detecting elements which captures the light emitted from the light source, and the drive signal generation unit may be operable to generate the drive signal from the electrical signal outputted from the photo-detecting element in the light source region which is set by the light source region setting unit. Here, the light source region setting unit may be operable to set, as the light source region, a region among the photo-detecting elements, the region including at least one of the photo-detecting elements which outputs an electrical signal having a level greater than a predetermined level, for example. Accordingly, the drive signal is generated only from the electrical signal which is outputted from the region where the light from the light source is captured, thereby enabling to eliminate influence of light except the light from the light source, so that it is possible to achieve more accurate synchronization.

Furthermore, the image capturing apparatus may further includes an image signal selection unit operable: to determine whether or not the signal synchronized with the electrical signal outputted from the light source detection unit can be generated; to select one of the image signal generated by the signal processing unit and a null signal, based on a result of the determination: and to output the selected signal. More specifically, the drive signal generation unit may include a phase adjustment unit operable to adjust a phase of the drive signal in order to be synchronized with a phase of the electrical signal outputted from the light source detection unit, and the image signal selection unit may be operable to select the image signal in a case that an amount of the phase adjusted by the phase adjustment unit is zero, and alternatively to select the null signal in a case that the amount is not zero. Accordingly, the image processing unit, which processes images from the image signals from the plurality of image capturing apparatuses, can process the images only from image signals which are captured in synchronization with the light from the light source, are captured for the object to be processed by the image processing unit, and are outputted from the image capturing apparatuses with synchronized timing.

Note that the present invention can be implemented not only as the above-described image capturing apparatus, but also as an image capturing method which includes processing performed by the image capturing apparatus, and as a program which causes a computer to perform the processing. Note also that it is obvious that such a program can be distributed via a transmission medium such as the Internet, or a memory medium such as a CD-ROM.

BEST MODE FOR CARRYING OUT THE INVENTION

The following describes embodiments according to the prevent invention with reference to the drawings.

First Embodiment

Firstly, an image capturing apparatus according to the first embodiment of the present invention is described herein below.

Figure 1:
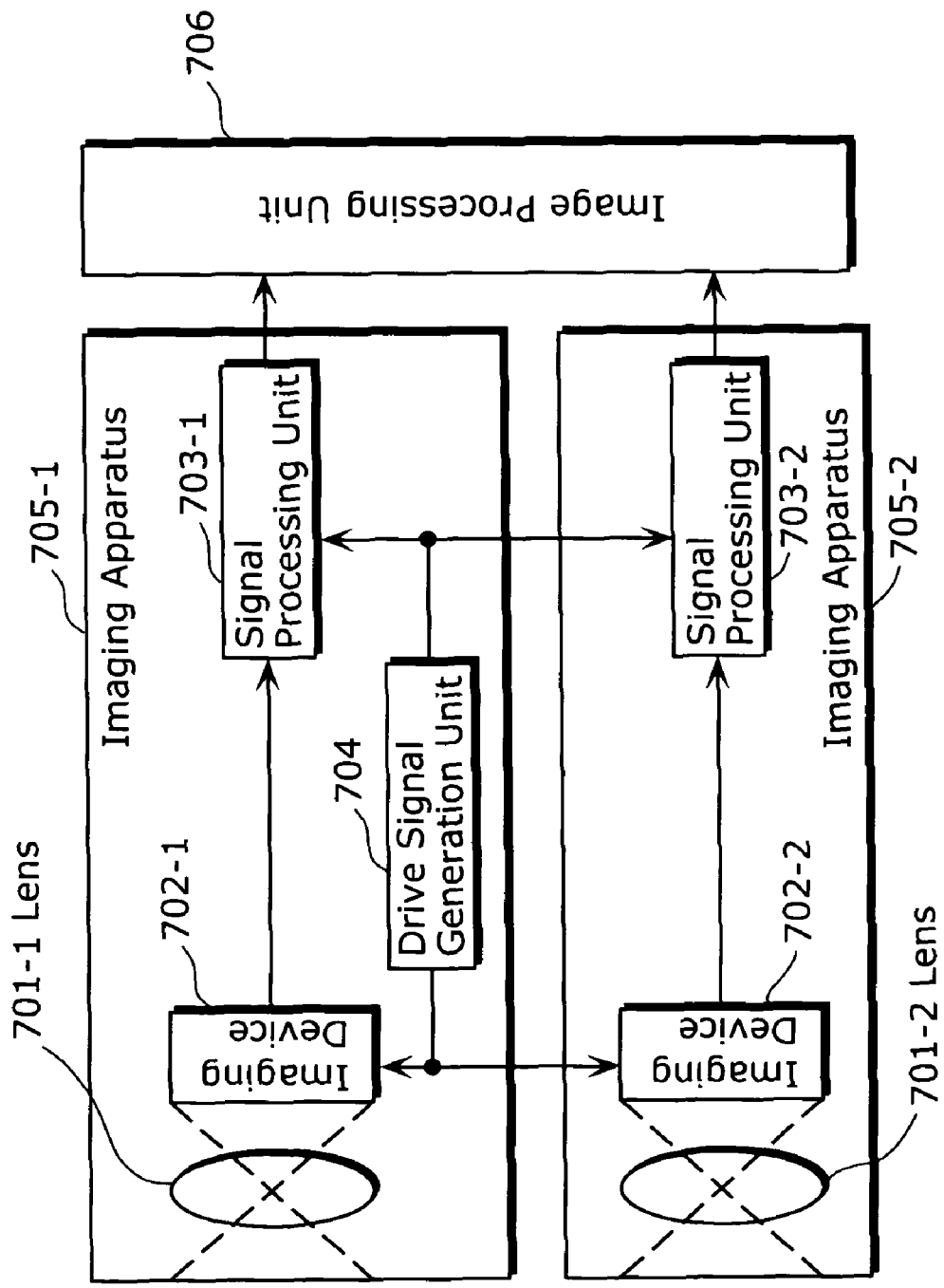
FIG. 1 is a diagram showing a structure of the conventional stereo image capturing apparatus.
Figure 2:
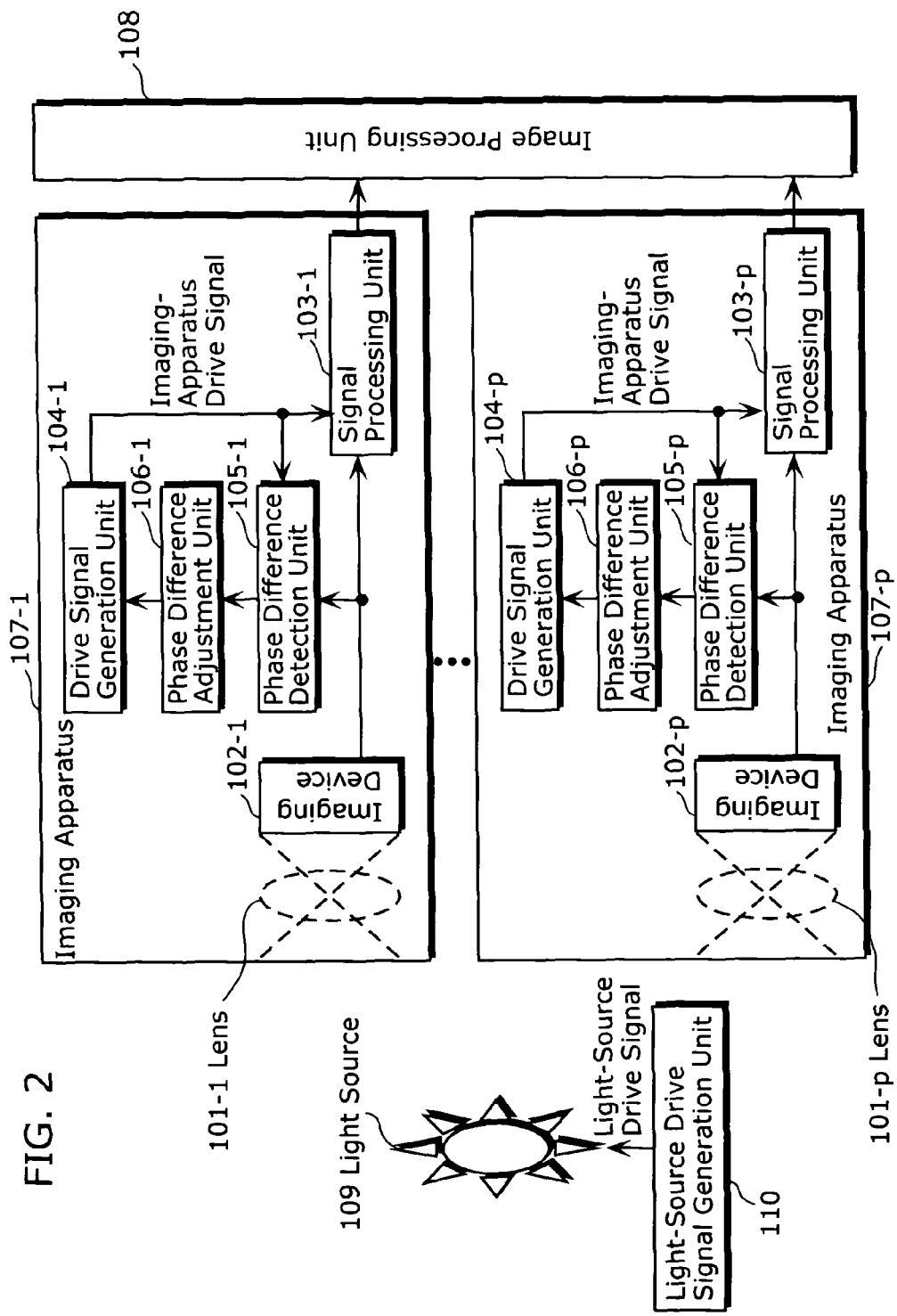
FIG. 2 is a diagram showing a structure of an image capturing apparatus according to the first embodiment of the present invention.

FIG. 2 is a block diagram showing a structure of the image capturing apparatus according to the first embodiment. Referring to FIG. 2, lenses 101-1 to 101-p(p is a whole number) focus respective collected light. Imaging devices 102-1 to 102-p, such as photo-transistors, do not need a drive signal, do not accumulate the light in a time period, but output, in real time, respective electrical signals at a level proportional to intensity of the light focused by the lenses 101-1 to 101-p. Signal processing units 103-1 to 103-p convert, into respective image signals, the electrical signals outputted from the imaging devices 102-1 to 102-p. Note that, when the signal processing units 103-1 to 103-p convert the electrical signals to the image signals, the image signals are generated to include respective picture sequences in synchronization with respective imaging-apparatus drive signals which are generated by respective drive signal generation units 104-1 to 104-p and used to drive the units in the respective imaging apparatuses 107-1 to 107-p.

Furthermore, the drive signal generation units 104-1 to 104-p generate the respective imaging-apparatus drive signals having a cycle $T_1$ in order to drive the signal processing units 103-1 to 103-p. A light-source drive signal generation unit 110 generates a light-source drive signal which is used to drive the light source 109 and has a cycle $T_2$ that is K (K is a whole number) times longer than the cycle $T_1$ of the imaging-apparatus drive signals. Phase difference detection units 105-1 to 105-p detect respective phase differences between the electrical signals outputted from the imaging devices 102-1 to 102-p and the imaging-apparatus drive signals generated by the drive signal generation units 104-1 to 104-p. Phase difference adjustment units 106-1 to 106-p generate respective phase adjustment signals which is used to adjust the phases of the drive signals generated by the drive signal generation units 104-1 to 104-p, in order to modify the phase differences outputted from the phase difference detection units 105-1 to 105-p to a phase difference target value $\Delta Tt$ which is one and the same value shared among the plurality of imaging apparatuses; and the light source 109 emits the light whose intensity varies depending on the light-source drive signal having the cycle $T_2$ which is generated by the light-source drive signal generation unit 110.

Moreover, the imaging apparatuses 107-1 to 107-p include the lenses 101-1 to 101-p, the imaging devices 102-1 to 102-p, the signal processing units 103-1 to 103-p, the drive signal generation units 104-1 to 104-p, the phase difference detection units 105-1 to 105-p, and the phase difference adjustment units 106-1 to 106-p, respectively. An image processing unit 108 processes an image from the image signals outputted from the imaging apparatuses 107-1 to 107-p.

Figure 3:
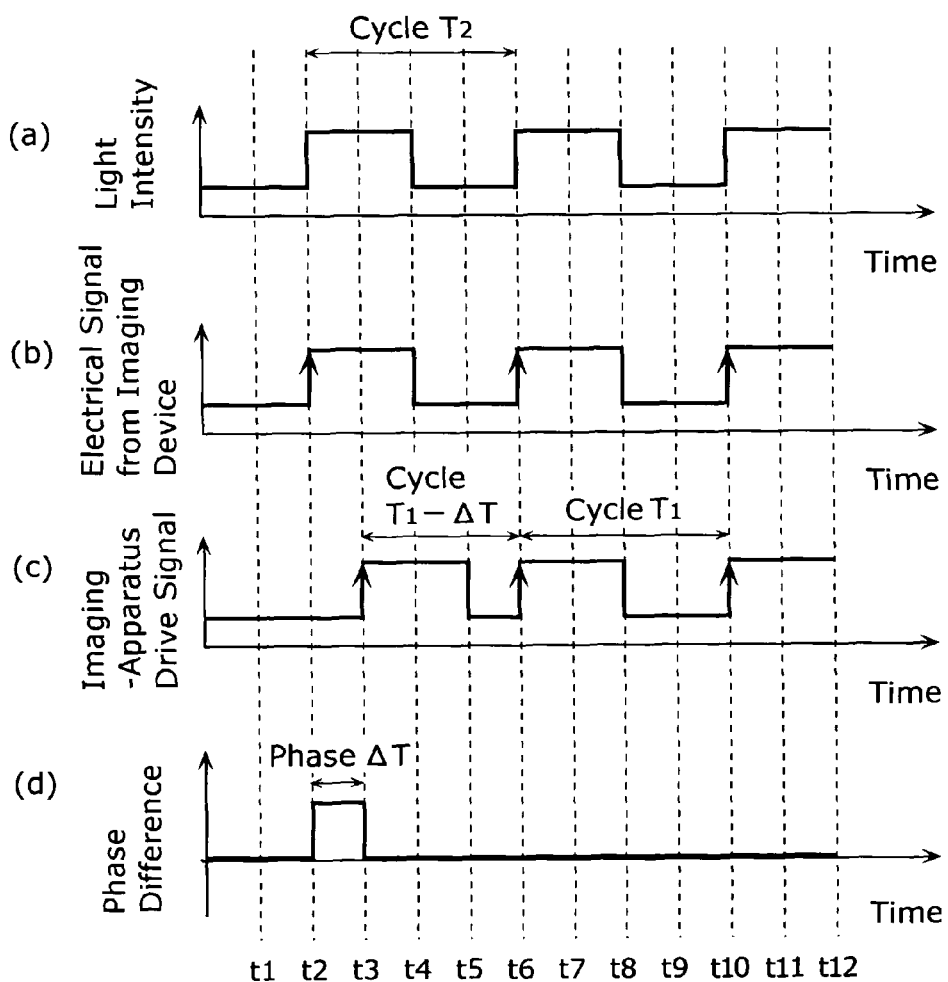
FIG. 3 is a timing chart in which (a) shows light intensity variations in time periods regarding light emitted from a light source, according to the first embodiment of the present invention; (b) shows value variations in time periods regarding an electrical signal outputted from an imaging device, according to the first embodiment of the present invention; (c) shows value variations in time periods regarding an imaging-apparatus drive signal, according to the first embodiment of the present invention; and (d) shows phase difference variations in time periods, according to the first embodiment of the present invention.

FIG. 3 is a timing chart showing operations of the image capturing apparatus according to the first embodiment. Referring to FIG. 3, (a) shows intensity variations in time periods regarding the light which is emitted from the light source 109, in which the light intensity of the light source 109 has a rectangular waveform and varies on the cycle $T_2$ that is one time as long as the cycle $T_1$; (b) shows value variations in time periods regarding the electrical signal which is outputted from one of the imaging devices from 102-1 to 102-p; (c) shows value variations in time periods regarding the imaging-apparatus drive signal having the cycle $T_1$ which is generated by one of the drive signal generation units from 104-1 to 104-p; and (d) shows value variations in time periods regarding the phase difference which is detected by one of the phase difference detection units from 105-1 to 105-p.

Operations of the image capturing apparatus according to the first embodiment are described herein below with reference to FIGS. 2 and 3.

Firstly, the light emitted from the light source 109, whose intensity varies on the cycle $T_2$ as shown in (a) of FIG. 3, is incident on each imaging apparatus from 107-1 to 107-p.

Next, the light which is emitted from the light source 109 and incident on each imaging apparatus from 107-1 to 107-p is focused by each lens from 101-1 to 101-p, and then converted into an electrical signal by each imaging device from 102-1 to 102-p. Thereby, as shown in (b) of FIG. 3, a phase of the outputted electrical signal matches a phase of the light intensity emitted from the light source 109.

Next, each electrical signal is inputted into each signal processing unit from 103-1 to 103-p and also into each phase difference detection unit from 105-1 to 105-p.

Then, each phase difference detection unit from 105-1 to 105-p detects each phase difference $\Delta T$ between the phase of the inputted electrical signal and a phase of the imaging-apparatus drive signal outputted from each drive signal generation unit from 104-1 to 104-p. Here, the cycle $T_2$ of the light intensity is one time as long as the cycle $T_1$ of the imaging-apparatus drive signal, so that the phase difference is set to as a time difference between a rising edge of the electrical signal and a rising edge of the drive signal, for example, set to as a phase difference $\Delta T$ which is a time difference between a time t2 and a time t3, as shown in (d) of FIG. 3. Moreover, in a case that the cycle $T_2$ of the light intensity is K times longer than the cycle $T_1$ of the imaging-apparatus drive signal, K types of the phase difference $\Delta T$ are eventually calculated, but in such a case, a minimum phase difference $\Delta T$ is set to as the phase of the imaging-apparatus drive signal for all imaging apparatuses 107-1 to 107-p.

Next, each phase difference adjustment unit from 106-1 to 106-p outputs a phase adjustment signal for adjusting the phase of the imaging-apparatus drive signal using the phase difference $\Delta T$. As shown in (c) of FIG. 3, the phase of the imaging-apparatus drive signal which starts at a time t3 is adjusted to modify the phase difference by being changed to have a range $T_1$-$\Delta T$, and eventually the phase ends at a time t6, so that a following phase of the imaging-apparatus drive signal matches a following phase of the electrical signal of the imaging device from 102-1 to 102-p.

Note that (c) of FIG. 3 shows a case that $\Delta Tt=0$, where $\Delta Tt$ is a phase difference target value for all imaging apparatuses 107-1 to 107-p, but the phase adjustment completes when the phase difference $\Delta T$ becomes $\Delta Tt$, even if the phase of the drive signal does not match the phase of the electrical signal of the imaging device from 102-1 to 102-p.

Next, each drive signal generation unit from 104-1 to 104-p generates an imaging-apparatus drive signal whose phase is adjusted by the phase adjustment signal. Thereby, each drive signal generation unit from 104-1 to 104-p generates the imaging-apparatus drive signal whose phase matches the phase of the light intensity of the light source 109, so that it is possible to synchronize a timing of capturing images of one object by the plurality of imaging apparatuses 107-1 to 107-p, on which the light from the light source 109 is incident. This means that the signal processing units 103-1 to 103-p can generate respective image signals, each of which includes a picture sequence in synchronization with each drive signal which is generated at the same timing shared among the plurality of imaging apparatuses.

Next, the image processing unit 108 processes an image from those image signals which are inputted from the image apparatuses 107-1 to 107-p and whose capturing timings are synchronized among the plurality of the imaging apparatuses. As described above, by matching the amplitude phase of the light from the light source 109 which is incident on each imaging apparatus from 107-1 to 107-p, to the phase of the imaging-apparatus drive signal for each imaging apparatus from 107-1 to 107-p, the image capturing apparatus according to the first embodiment can be implemented without a synchronizing signal generation unit having a problem of a cost increase, and can reduce connections among the imaging apparatuses 107-1 to 107-p having a problem of a installation load increase.

Note that the image capturing apparatus according to the first embodiment has described that the phase is detected by using the rising edge of the electrical signal outputted from each imaging apparatus 102-1 to 102-p, but the method for detecting phase is not limited to the above.

Figure 4:
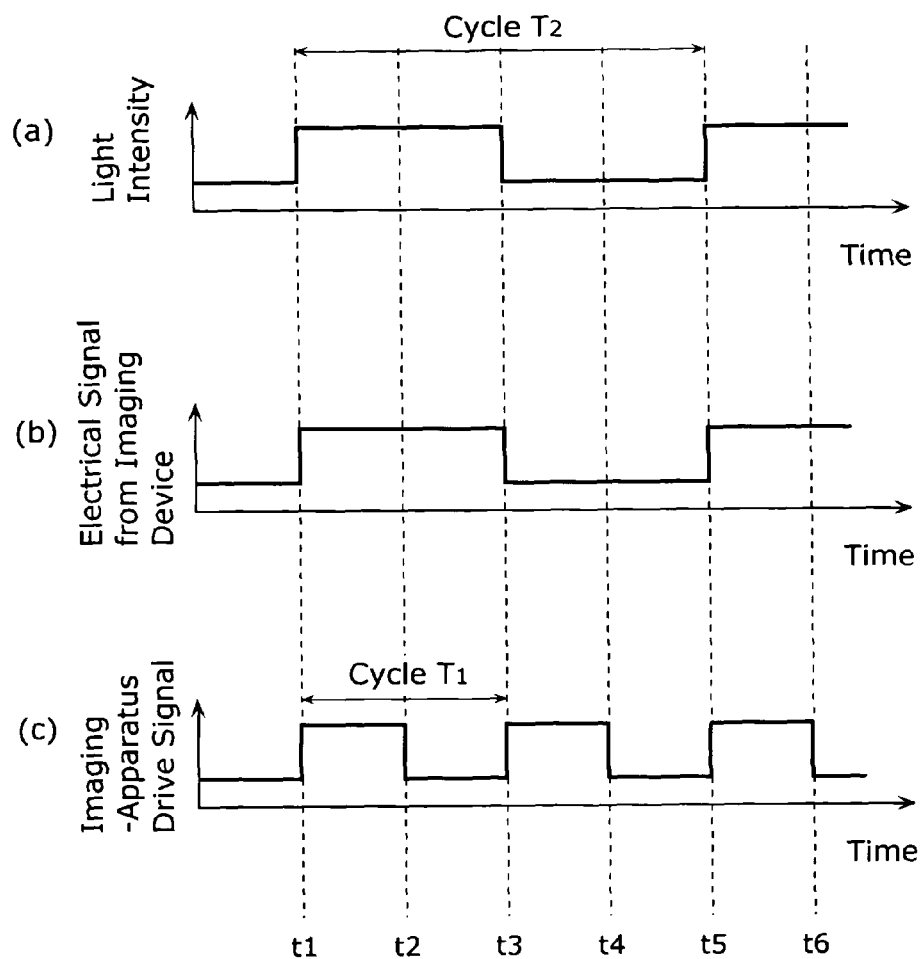
FIG. 4 is a timing chart in which (a) shows light intensity variations in time periods; (b) shows value variations in time periods regarding the electrical signal of the imaging device; and (c) shows value variations in time periods regarding the imaging-apparatus drive signal, respectively in a case that a cycle of the imaging-apparatus drive signal is twice longer than a cycle of the light intensity of the light source.

Note also that the image capturing apparatus according to the first embodiment has described that the cycle $T_2$ of the intensity of the light from the light source 109 is one time as long as the cycle $T_1$, but the cycle $T_2$ of the intensity of the light from the light source 109 may be K (K is a whole number) times longer than the cycle $T_1$ as shown in FIG. 4 in order to achieve the same effect as described above, since, by applying Phase Locked Loop (PLL), the frequencies are synchronized with each other by using, as a reference value, the phase of the intensity of the light from the light source 109.

Note also that the image capturing apparatus according to the first embodiment has not defined a path by which the light emitted from the light source 109 is incident on each imaging apparatus from 107-1 to 107-p. It is obvious that, even if the light emitted from the light source 109 is reflected by something and the reflected light is incident on the imaging apparatuses 107-1 to 107-p, the image capturing apparatus according to the first embodiment can achieve the same effect as described above, by using such light.

Figure 5:
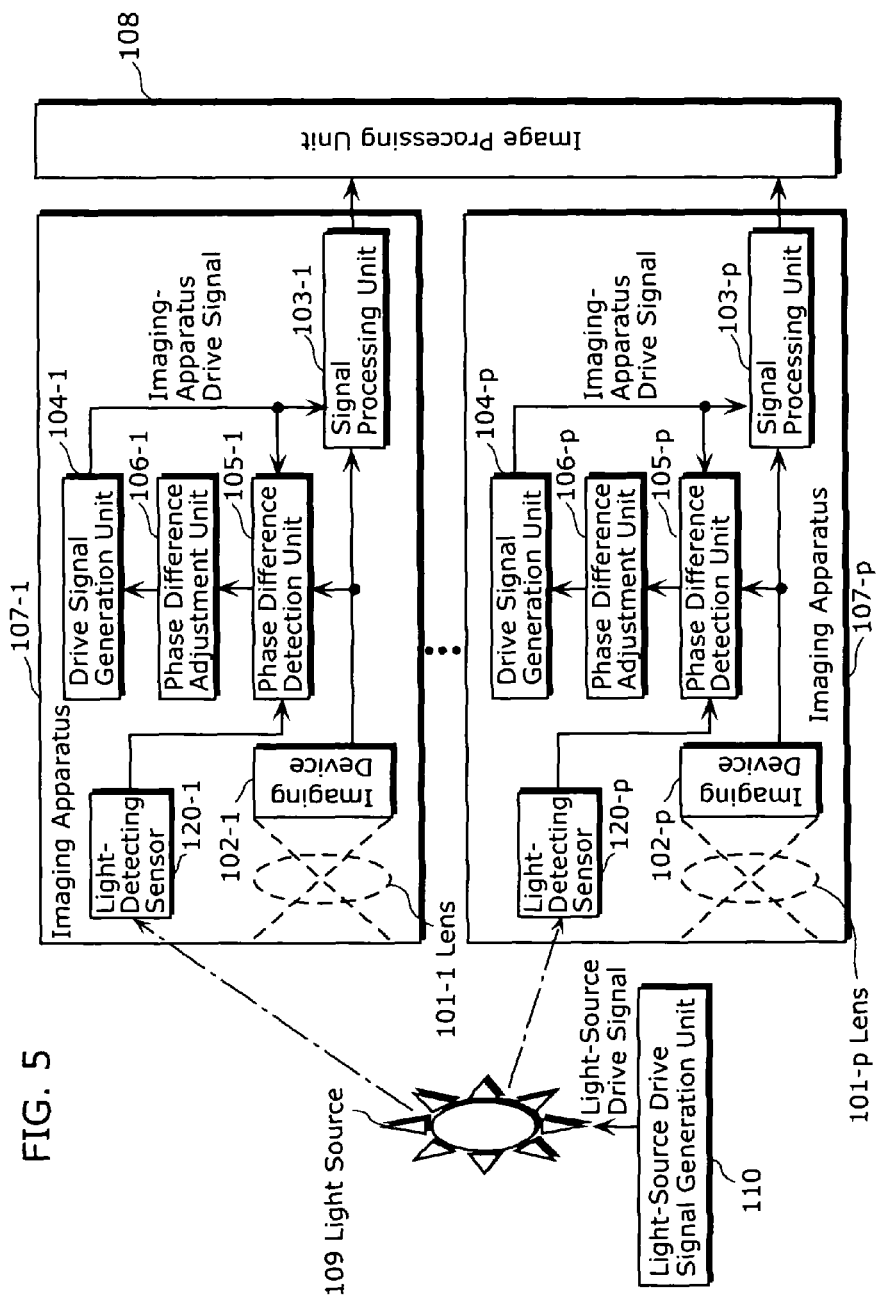
FIG. 5 is a block diagram showing one example of a structure of an image capturing apparatus in which a light-detecting sensor for detecting only the light source is included besides an imaging device.

Note also that, in the image capturing apparatus according to the first embodiment, a sensor for detecting the light emitted from the light source 109 is identical to a sensor for capturing images of an object (imaging device from 102-1 to 102-p), but, as shown in FIG. 5, it is possible to add sensors 120-1 to 120-p for detecting the light emitted from the light source 109 besides the imaging devices 102-1 to 102-p. In this case, each phase difference detection unit from 105-1 to 105-p detects a phase difference between an electrical signal outputted from each light-detecting sensor from 120-1 to 120-p and the imaging-apparatus drive signal outputted from each drive signal generation unit from 104-1 to 104-p.

Second Embodiment

Next, the following describes an image capturing apparatus according to the second embodiment of the present invention. The second embodiment differs from the first embodiment in a type of the imaging device. While the imaging device in the first embodiment outputs, in real time, the electrical signal corresponding to the light intensity, but the imaging device in the second embodiment accumulates an electric charge corresponding to the light intensity in a certain time period, and then outputs an electrical signal corresponding to the accumulated electric charge.

Figure 6:
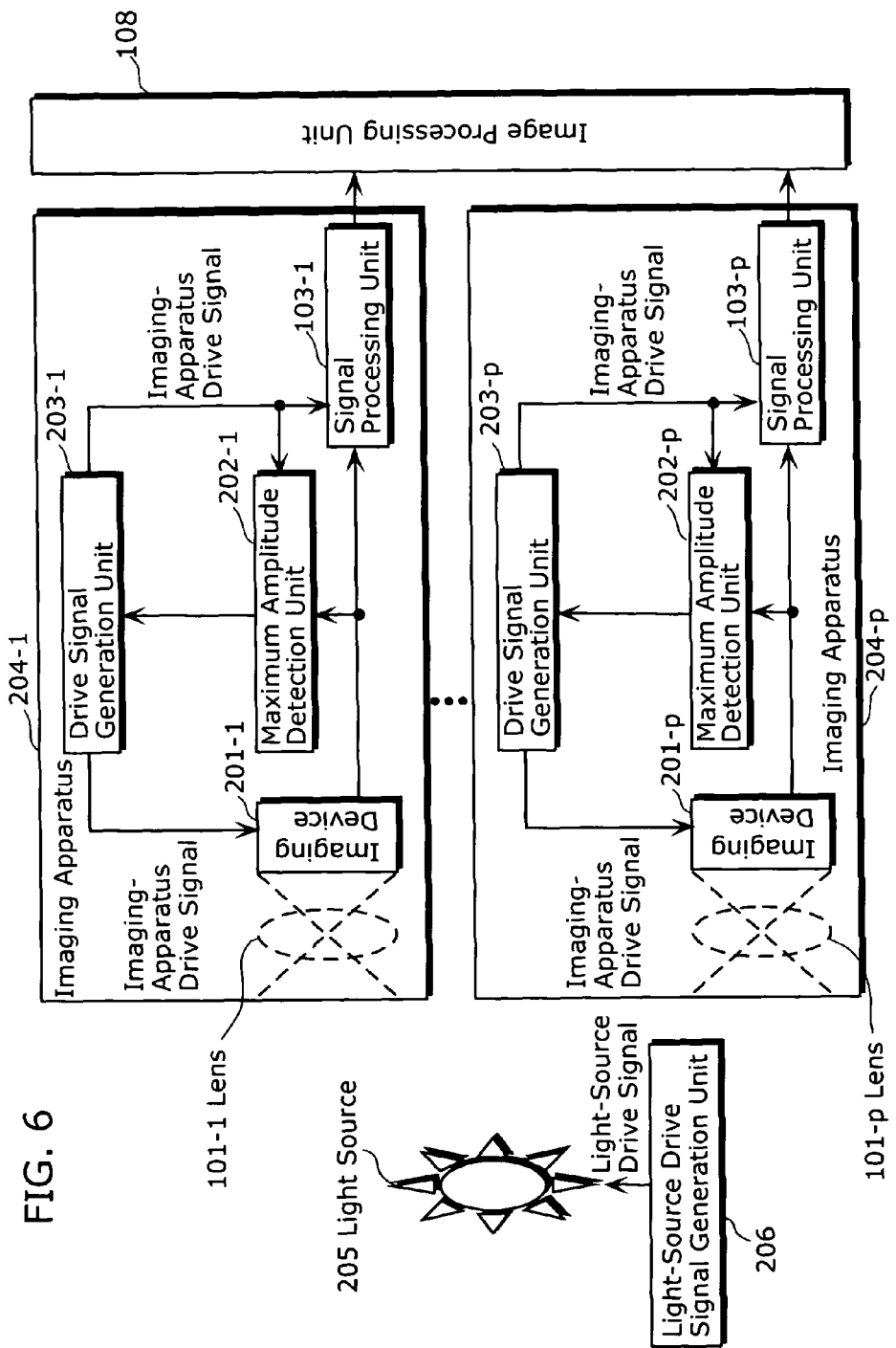
FIG. 6 is a diagram showing a structure of an image capturing apparatus according to the second embodiment.

FIG. 6 is a block diagram showing a structure of the image capturing apparatus according to the second embodiment.

Referring to FIG. 6, imaging devices 201-1 to 201-p, such as charge-coupled devices (CCD), need respective drive signals, accumulate the incident light in a time period of a cycle of the drive signal, and output respective electrical signals having a level proportional to the light intensity accumulated every time periods of the cycle of the drive signal. Drive signal generation units 203-1 to 203-p generate the respective imaging-apparatus drive signals having a cycle $T_1$ for driving the respective imaging devices 201-1 to 201-p and also the respective signal processing units 103-1 to 103-p. A light-source drive signal generation unit 206 generates a light-source drive signal having a cycle $T_2$ for driving a light source 205, where the cycle $T_2$ is K (K is a whole number) times longer than the cycle $T_1$.

Furthermore, maximum amplitude detection units 202-1 to 202-p detect amplitudes of the respective electrical signals which are outputted from the imaging devices 201-1 to 201-p, and adjust phases of the respective imaging-apparatus drive signals which are outputted from the drive signal generation units 203-1 to 203-p in order to achieve predetermined maximum amplitudes. The light source 205 is driven by the light-source drive signal which is outputted from the light-source drive signal generation unit 206, and emits light whose intensity varies depending on the cycle $T_2$.

Still further, imaging apparatuses 204-1 to 204-p include the lenses 101-1 to 101-p, the imaging devices 201-1 to 201-p, the signal processing units 103-1 to 103-p, the drive signal generation units 203-1 to 203-p, and the maximum amplitude detection units 202-1 to 202-p, respectively.

Note that the lenses 101-1 to 101-p, the signal processing units 103-1 to 103-p, and the image processing unit 108 are the same units as described in the first embodiment, so that the details of these units are not described herein.

Next, operations of the image capturing apparatus according to the second embodiment are described in detail herein below.

Figure 7:
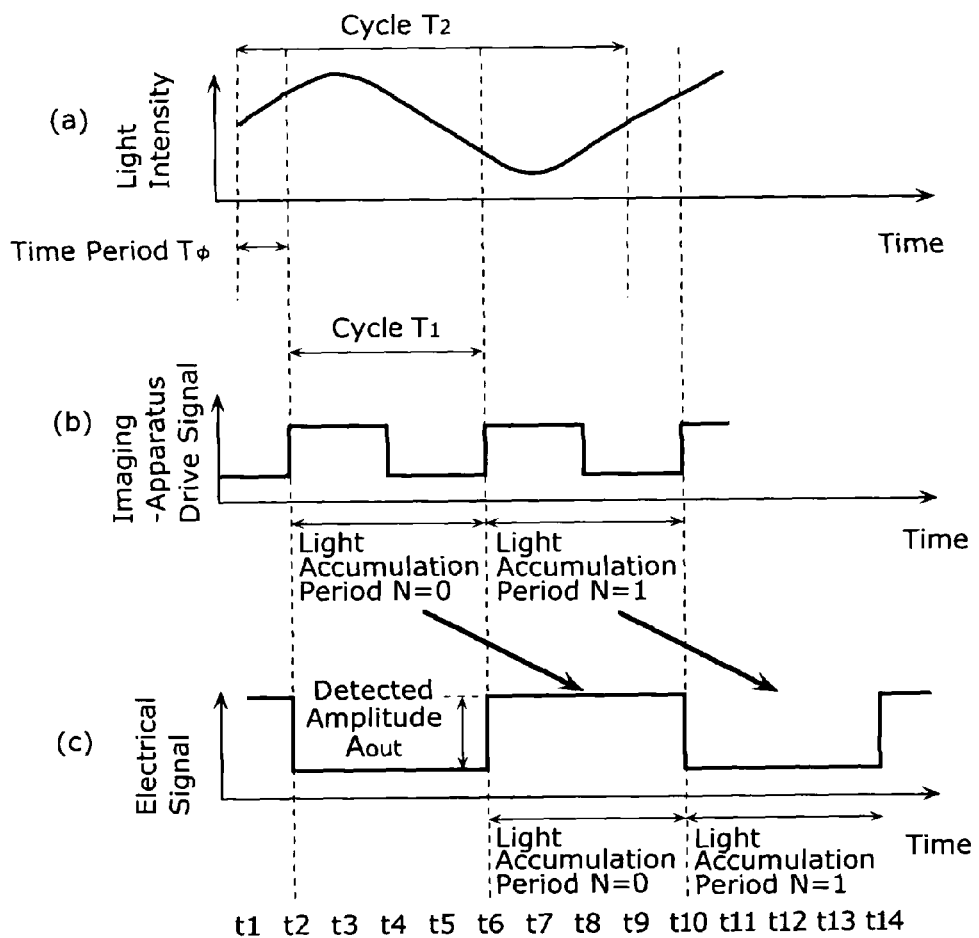
FIG. 7 is a timing chart in which (a) shows light intensity variations in time periods regarding light emitted from a light source, according to the second embodiment of the present invention; (b) shows value variations in time periods regarding an imaging-apparatus drive signal, according to the second embodiment of the present invention; and (c) shows value variations in time periods regarding an electrical signal of an imaging device, according to the second embodiment of the present invention.

Referring to FIG. 7, (a) shows intensity variations in time periods regarding the light which is emitted from the light source 205, in which a vertical axis represents the light intensity and a horizontal axis represents time; (b) shows value variations in time periods regarding the imaging-apparatus drive signal which is outputted from one of the drive signal generation units 203-1 to 203-p; (c) shows value variations in time periods regarding the electrical signal which is outputted from one of the imaging devices 201-1 to 201-p, in which a vertical axis represents a voltage of the electrical signal and a horizontal axis represents time. The vertical axis represents time through (a) to (c) in FIG. 7.

Here, an amplitude waveform of the light intensity in (a) of FIG. 7 is represented by a sum of an odd function and a constant value. The amplitude waveform of the intensity of the light from the light source 205 has an amplitude waveform $f_L(t)$ of the light intensity which is determined by the following equation 1:

$$f_L(t) = A_0 + \sum_{n=1}^{\infty} A_n \sin\left(\frac{2\pi n}{T_2}t\right), \quad \text{(Equation 1)}$$

where $T_2$ represents a cycle, $A_O$ represents an amplitude of direct current wave, and $A_n$ represents an amplitude of each sine wave.

Note that the cycle $T_2$ is assumed to be twice longer than the cycle $T_1$. Note also that n represents a number which is assigned to a light accumulation period.

Firstly, the light emitted from the light source 205, whose intensity has an amplitude waveform $f_L(t)$ determined by the above equation 1, is incident on each imaging apparatus from 204-1 to 204-p.

Next, the incident light is focused by each lens from 101-1 to 101-p, and then converted into an electrical signal by each imaging device from 201-1 to 201-p.

Then, the imaging device from 201-1 to 201-p accumulates the light only in a period corresponding to a time period of the cycle $T_1$, and outputs an electrical signal having a voltage whose value is proportional to the accumulated light intensity for each time period corresponding to the cycle $T_1$. Thereby, an electrical signal F(N) is outputted from each imaging device from 201-1 to 201-p, and inputted to each signal processing unit from 103-1 to 103-p and also to each maximum amplitude detection unit from 103-1 to 103-p, where the electrical signal F(N) is determined by the following equation 2:

$$F(N) = \int_{NT_1+T_d}^{(N+1)T_1+T_d} f_L(t)\,dt = \quad \text{(Equation 2)}$$

$$A_0 T_1 - \sum_{n=1}^{\infty} \frac{A_n T_2}{2\pi} \left\{ \cos\left(\frac{2\pi n}{T_2}((N+1)T_1 + T_d)\right) - \cos\left(\frac{2\pi n}{T_2}(NT_1 + T_d)\right) \right\} = A_0 T_1 +$$

$$\sum_{n=1}^{\infty} \frac{A_n T_2}{\pi} \sin\left(\frac{\pi n}{T_2}(2N+1)T_1 + \frac{2\pi n}{T_2}T_d\right) \sin\left(\frac{\pi n}{T_2}T_1\right)$$

Since $T_2 = 2T_1 = A_0 T_1 +$ $$\sum_{n=0}^{\infty} \frac{2A_{(4n+1)}T_1}{\pi} \sin\left(\frac{\pi(4n+1)}{2}(2N+1) + \frac{\pi(4n+1)}{T_1}T_d\right) -$$

$$\sum_{n=0}^{\infty} \frac{2A_{(4n+3)}T_1}{\pi} \sin\left(\frac{\pi(4n+3)}{2}(2N+1) + \frac{\pi(4n+3)}{T_1}T_d\right).$$

Next, the maximum amplitude detection unit from 202-1 to 202-p detects an amplitude $A_{out}$ of the inputted electrical signal F(N).

Here, it is assumed that there are an electrical signal F(2a) which has a voltage whose value is proportional to light intensity accumulated in a light accumulation period N=2a (a is a positive integer), and an electrical signal F(2a+1) which has a voltage whose value is proportional to light intensity accumulated in a light accumulation period N=2a+1. Both of the electrical signal F(2a) and the electrical signal F(2a+1) are electrical signals which are outputted from one of the imaging devices 201-1 to 201-p, where the electrical signal F(2a) is determined by the following equation 3, and the electrical signal F(2a+1) is determined by the following equation 4:

$$F(2a) = A_0 T_1 + \quad \text{(Equation 3)}$$

$$\sum_{n=0}^{\infty} \frac{2A_{(4n+1)}T_1}{\pi} \sin\left(\frac{(4a+1)\pi(4n+1)}{2} + \frac{\pi(4n+1)}{T_1}T_d\right) -$$

$$\sum_{n=0}^{\infty} \frac{2A_{(4n+3)}T_1}{\pi} \sin\left(\frac{(4a+1)\pi(4n+3)}{2} + \frac{\pi(4n+3)}{T_1}T_d\right) =$$

$$A_0 T_1 + \sum_{n=0}^{\infty} \frac{2A_{(4n+1)}T_1}{\pi} \cos\left(\frac{\pi(4n+1)}{T_1}T_d\right) +$$

$$\sum_{n=0}^{\infty} \frac{2A_{(4n+3)}T_1}{\pi} \cos\left(\frac{\pi(4n+3)}{T_1}T_d\right) =$$

$$A_0 T_1 + \sum_{n=0}^{\infty} \frac{2A_{(2n+1)}T_1}{\pi} \cos\left(\frac{\pi(2n+1)}{T_1}T_d\right) =$$

$$A_0 T_1 + \cos\left(\frac{\pi T_d}{T_1}\right) \sum_{n=0}^{\infty} \frac{2A_{(2n+1)}T_1}{\pi}, \text{ and}$$

$$F(2a+1) = A_0 T_1 + \quad \text{(Equation 4)}$$

$$\sum_{n=0}^{\infty} \frac{2A_{(4n+1)}T_1}{\pi} \sin\left(\frac{(4a+3)\pi(4n+1)}{2} + \frac{\pi(4n+1)}{T_1}T_d\right) -$$

$$\sum_{n=0}^{\infty} \frac{2A_{(4n+3)}T_1}{\pi} \sin\left(\frac{(4a+3)\pi(4n+3)}{2} + \frac{\pi(4n+3)}{T_1}T_d\right) =$$

$$A_0 T_1 - \sum_{n=0}^{\infty} \frac{2A_{(4n+1)}T_1}{\pi} \cos\left(\frac{\pi(4n+1)}{T_1}T_d\right) -$$

$$\sum_{n=0}^{\infty} \frac{2A_{(4n+3)}T_1}{\pi} \cos\left(\frac{\pi(4n+3)}{T_1}T_d\right) =$$

$$A_0 T_1 - \sum_{n=0}^{\infty} \frac{2A_{(2n+1)}T_1}{\pi} \cos\left(\frac{\pi(2n+1)}{T_1}T_d\right) =$$

$$A_0 T_1 - \cos\left(\frac{\pi T_d}{T_1}\right) \sum_{n=0}^{\infty} \frac{2A_{(2n+1)}T_1}{\pi},$$

where 2a=0, and 2a+1=1, in the second embodiment.

Here, light intensity from a time t1 to a time t6 in (a) of FIG. 7 is accumulated in the imaging device from 201-1 to 201-p in a light accumulation period N=0 in (b) of FIG. 7, and the imaging device from 201-1 to 201-p converts light intensity which is accumulated from a time t6 to a time t10 in (c) of FIG. 7, into an electrical signal to be outputted. Furthermore, the imaging device from 201-1 to 201-p accumulates, in a light accumulation period N=1 in (b) of FIG. 7, the light intensity from a time t6 to a time t10 in (a) of FIG. 7, and then outputs, from a time t10 to a time t14 in (c) of FIG. 7, an electrical signal corresponding to the accumulated light intensity.

Moreover, in a case that a time $T_d = b \times T_1$ (b is a positive integer), the electrical signal F(2a) becomes a maximum value and the electrical signal F(2a+1) becomes a minimum value, or alternatively the electrical signal F(2a) becomes a minimum value and the electrical signal F(2a+1) becomes a maximum value, so that the electrical signal outputted from the imaging device from 201-1 to 201-p has a maximum amplitude.

Next, an amplitude error ΔA is calculated by subtracting an maximum amplitude $A_{max}$ from the detected amplitude $A_{out}$, and the time $T_d$ is calculated to represent a phase difference between an intensity variation of the light from the light source 205 in a time period corresponding to the amplitude error ΔA and the imaging-apparatus drive signal outputted from the imaging apparatus from 204-1 to 204-p.

Here, in a case that the amplitude error ΔA=0, this means that respective amplitudes of the electrical signals outputted from a plurality of the imaging devices 201-1 to 201-p are the same, so that it is not necessary to adjust the phases of the imaging-apparatus drive signals. Furthermore, in a case that the amplitude error ΔA≠0, a phase adjustment period is set to shorten or extend the cycle $T_1$ of the imaging-apparatus drive signal by using the time $T_d$ representing the phase difference, and then after adjusting the phase of the drive signal, the amplitude $A_{out}$ of the electrical signal of the imaging device from 201-1 to 201-p is detected again and compared with the maximum amplitude $A_{max}$.

As described above, by adjusting the phases of a plurality of the imaging apparatuses 204-1 to 204-p by using the light intensity from the light source 205, the image capturing apparatus according to the second embodiment can be implemented without a synchronizing signal generation unit having the problem of the cost increase, and without wiring among the imaging apparatuses 204-1 to 204-p having the problem of the installation load increase.

Note that, in the image capturing apparatus according to the second embodiment of the present invention, the amplitude waveform of the light intensity of the light from the light source 205 is a waveform represented by a sum of an odd function value and a constant value. However, if the waveform is represented by a sum of an odd function and a constant value which is determined by the following equation 5, the electrical signal outputted from the imaging device from 201-1 to 201-p can be determined by the following equation 6, and the electrical signal F(2a) can be determined by the following equation 7, and the electrical signal F(2a+1) can be determined by the following equation 8:

$$f_L(t) = A_0 + \sum_{n=1}^{\infty} A_n \cos\left(\frac{2\pi n}{T_2}t\right), \quad \text{(Equation 5)}$$

where $T_2$ represents a cycle, $A_0$ represents an amplitude of a direct current wave, and $A_n$ represents an amplitude of each cosine wave, $$F(N) = \int_{NT_1+T_4}^{(N+1)T_1+T_d} f_L(t)\,dt = \quad \text{(Equation 6)}$$

$$A_0 T_1 - \sum_{n=1}^{\infty} \frac{A_n T_2}{2\pi} \left\{ \sin\left(\frac{2\pi n}{T_2}((N+1)T_1 + T_d)\right) - \sin\left(\frac{2\pi n}{T_2}(NT_1 + T_d)\right) \right\} = A_0 T_1 +$$

$$\sum_{n=1}^{\infty} \frac{A_n T_2}{\pi} \sin\left(\frac{\pi n}{T_2}(2N+1)T_1 + \frac{2\pi n}{T_2}T_d\right)\sin\left(\frac{\pi n}{T_2}T_1\right)$$

Since $T_2 = 2T_1 = A_0 T_1 + \sum_{n=0}^{\infty} \frac{2A_{(4n+1)}T_1}{\pi}$ $$\cos\left(\frac{\pi(4n+1)}{2}(2N+1) + \frac{\pi(4n+1)}{T_1}T_d\right) - \sum_{n=0}^{\infty} \frac{2A_{(4n+3)}T_1}{\pi}\cos\left(\frac{\pi(4n+3)}{2}(2N+1) + \frac{\pi(4n+3)}{T_1}T_d\right),$$

-continued $$F(2a) = A_0 T_1 + \quad \text{(Equation 7)}$$

$$\sum_{n=0}^{\infty} \frac{2A_{(4n+1)}T_1}{\pi}\cos\left(\frac{(4a+1)\pi(4n+1)}{2} + \frac{\pi(4n+1)}{T_1}T_d\right) -$$

$$\sum_{n=0}^{\infty} \frac{2A_{(4n+3)}T_1}{\pi}\cos\left(\frac{(4a+1)\pi(4n+3)}{2} + \frac{\pi(4n+3)}{T_1}T_d\right) =$$

$$A_0 T_1 + \sum_{n=0}^{\infty} \frac{2A_{(4n+1)}T_1}{\pi}\sin\left(\frac{\pi(4n+1)}{T_1}T_d\right) -$$

$$\sum_{n=0}^{\infty} \frac{2A_{(4n+3)}T_1}{\pi}\sin\left(\frac{\pi(4n+3)}{T_1}T_d\right) =$$

$$A_0 T_1 - \sum_{n=0}^{\infty} \frac{2A_{(2n+1)}T_1}{\pi}\sin\left(\frac{\pi(2n+1)}{T_1}T_d\right) =$$

$$A_0 T_1 - \sin\left(\frac{\pi T_d}{T_1}\right)\sum_{n=0}^{\infty} \frac{2A_{(2n+1)}T_1}{\pi}, \text{ and}$$

$$F(2a+1) = A_0 T_1 + \quad \text{(Equation 8)}$$

$$\sum_{n=0}^{\infty} \frac{2A_{(4n+1)}T_1}{\pi}\cos\left(\frac{(4a+3)\pi(4n+1)}{2} + \frac{\pi(4n+1)}{T_1}T_d\right) -$$

$$\sum_{n=0}^{\infty} \frac{2A_{(4n+3)}T_1}{\pi}\cos\left(\frac{(4a+3)\pi(4n+3)}{2} + \frac{\pi(4n+3)}{T_1}T_d\right) =$$

$$A_0 T_1 + \sum_{n=0}^{\infty} \frac{2A_{(4n+1)}T_1}{\pi}\sin\left(\frac{\pi(4n+1)}{T_1}T_d\right) +$$

$$\sum_{n=0}^{\infty} \frac{2A_{(4n+3)}T_1}{\pi}\sin\left(\frac{\pi(4n+3)}{T_1}T_d\right) =$$

$$A_0 T_1 + \sum_{n=0}^{\infty} \frac{2A_{(2n+1)}T_1}{\pi}\sin\left(\frac{\pi(2n+1)}{T_1}T_d\right) =$$

$$A_0 T_1 + \sin\left(\frac{\pi T_d}{T_1}\right)\sum_{n=0}^{\infty} \frac{2A_{(2n+1)}T_1}{\pi}.$$

Here, in a case that the time $T_d=(b+n/2)\times T_1$, the electrical signal F(2a) becomes a maximum value and the electrical signal F(2a+1) becomes a minimum value, or alternatively the electrical signal F(2a) becomes a minimum value and the electrical signal F(2a+1) becomes a maximum value, so that the electrical signal outputted from the imaging device from 201-1 to 201-p has a maximum amplitude.

Note also that the image capturing apparatus according to the second embodiment can be implemented without limiting a path by which the light emitted from the light source 205 is incident on each imaging apparatus from 204-1 to 204-p. It is obvious that, even if the light emitted from the light source 205 is reflected by something and the reflected light is incident on the imaging apparatuses 204-1 to 204-p, the image capturing apparatus according to the second embodiment can achieve the same effect as described above, by using such light.

Third Embodiment

Next, the following describes an image capturing apparatus according to the third embodiment of the present invention. The third embodiment differs from the first and second embodiments in that, from photo-detecting elements which are two-dimensionally arranged in the imaging device, a region is specified to include some of the photo-detecting elements that capture the light from the light source, in order to detect the intensity of the light from the light source by using electrical signal outputted from the region, not by using electrical signal outputted from all photo-detecting elements in the imaging device.

Figure 8:
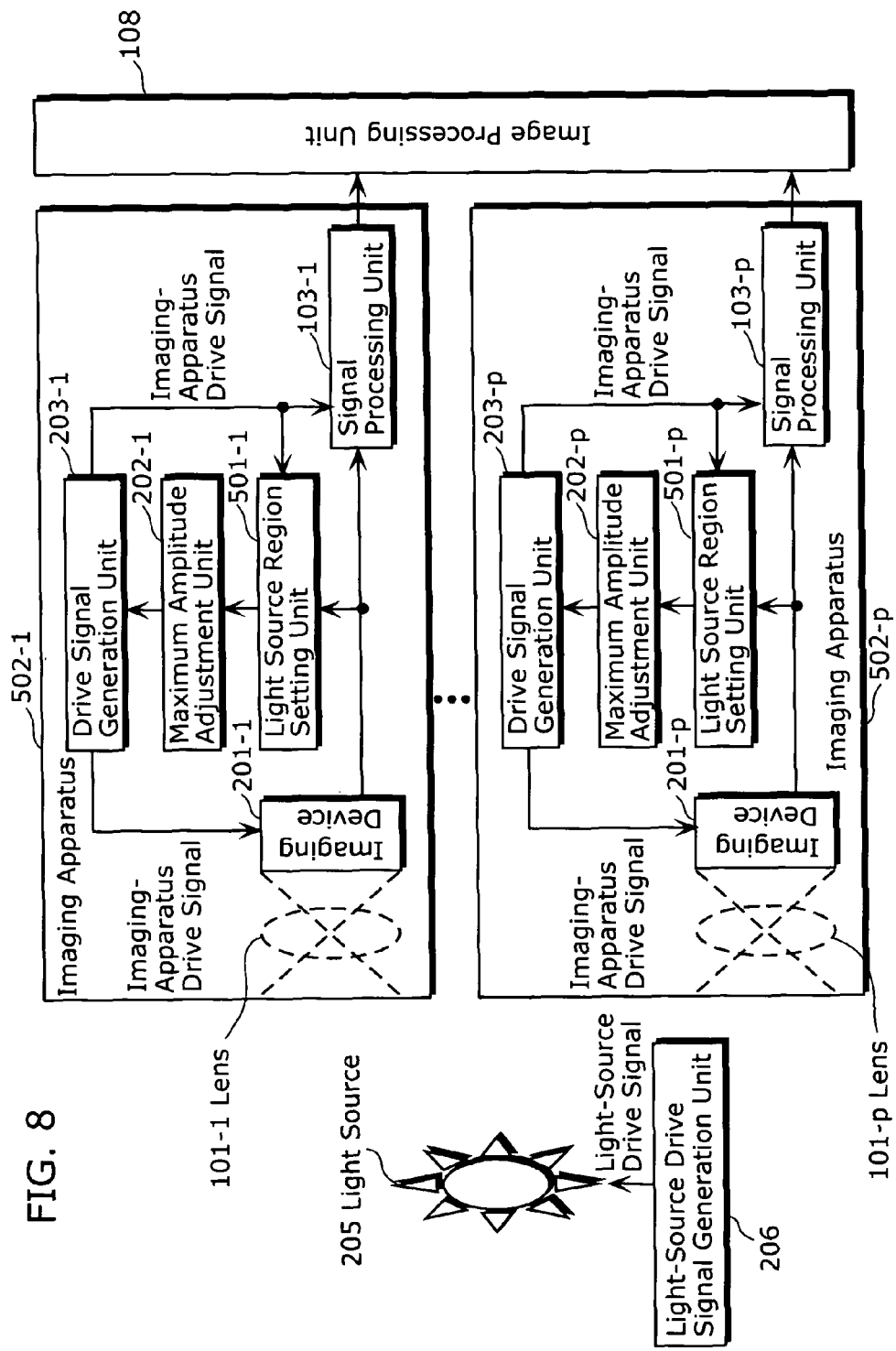
FIG. 8 is a diagram showing a structure of an image capturing apparatus according to the third embodiment.

FIG. 8 is a block diagram showing a structure of the image capturing apparatus according to the third embodiment. Referring to FIG. 8, light source region setting units 501-1 to 501-p restricts respective regions in the respective imaging devices 201-1 to 201-p for focusing the light emitted from the light source 205 in order to output respective electrical signals. The imaging apparatuses 502-1 to 502-p include the lenses 101-1 to 101-p, the imaging devices 201-1 to 201-p, the signal processing units 103-1 to 103-p, the drive signal generation units 203-1 to 203-p, the maximum amplitude detection units 202-1 to 202-p, and the light source region setting units 501-1 to 501-p, respectively.

Note that the lenses 101-1 to 101-p, the imaging devices 201-1 to 201-p, the signal processing units 103-1 to 103-p, the drive signal generation units 203-1 to 203-p, the maximum amplitude detection units 202-1 to 202-p, the image processing unit 108, the light source 205, and the light-source drive signal generation unit 206 are the same units as described in the second embodiment, so that the detail of those units are not described herein below.

The following describes operations of the image capturing apparatus according to the third embodiment with reference to FIG. 8.

In a case that light emitted from the light source 205 is focused on some photo-detecting elements in each imaging device from 201-1 to 201-p, the phase difference detection is not accurately performed due to an electrical signal corresponding to light which is not emitted from the light source 205, which would affect the phase adjustment performed by each imaging apparatus from 502-1 to 502-p. Therefore, in the third embodiment, an electrical signal which is not necessary for the phase adjustment is eliminated from the electrical signals which are outputted from each imaging device from 201-1 to 201-p, so that it is possible to improve accuracy of the phase adjustment.

Figure 9:
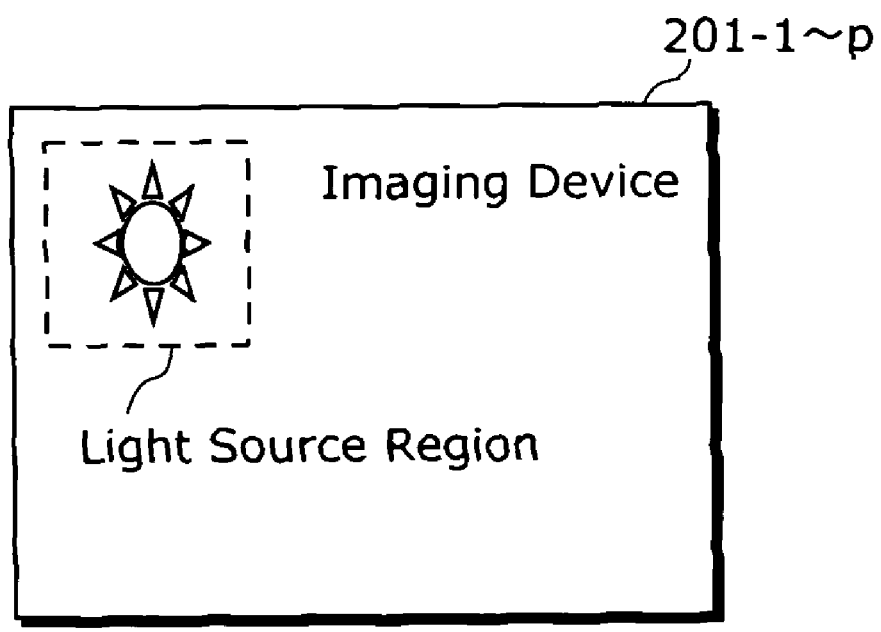
FIG. 9 is a diagram showing one example of a setting of a light source region by a light source region setting unit.

The light emitted from the light source 205 has stronger intensity as compared to light intensity of other light, so that each light source region setting unit from 501-1 to 501-p sets, as a light source region, a region of the electrical signal whose level is greater than a predetermined level, in the electrical signal which is outputted from each imaging device from 201-1 to 201-p. For example, as shown in FIG. 9, in each imaging device from 201-1 to 201-p that includes photo-detecting elements which are two-dimensionally arranged, a rectangular region including some photo-detecting elements for outputting an electrical signal whose level is greater than the predetermined level is specified, and the electrical signal outputted from the specified rectangular region is outputted, as an electrical signal corresponding to the light from the light source, into the maximum amplitude detection unit from 202-1 to 202-p. Each maximum amplitude detection unit from 202-1 to 201-p detects, in the same manner as described in the second embodiment, an amplitude of the light intensity from the electrical signal which is outputted from the light source region that is set by the light source region setting unit from 501-1 to 501-p, and a phase adjustment is performed for each phase of the imaging-apparatus drive signal which is outputted from each drive signal generation unit from 203-1 to 203-p, so that it is possible to adjust phases of a plurality of the imaging apparatuses 502-1 to 502-p.

As described above, in the third embodiment, an electrical signal corresponding to light which is not emitted from the light source 205 is eliminated from the electrical signal which is outputted from each imaging device from 201-1 to 201-p, thereby enabling to accurately detect the intensity variations in time periods regarding the light from the light source 205, so that it is possible to improve accuracy of the phase adjustment performed by a plurality of the imaging apparatuses 502-1 to 502-p.

Note that the image capturing apparatus according to the third embodiment has not defined a path by which the light emitted from the light source 205 is incident on each imaging apparatus from 502-1 to 502-p. It is obvious that, even if the light emitted from the light source 205 is reflected by something and the reflected light is incident on the imaging apparatuses 502-1 to 502-p, the image capturing apparatus according to the third embodiment can achieve the same effect as described above, by using such light.

Note also that the image capturing apparatus according to the third embodiment has a structure in which the light source region setting units 501-1 to 501-p are added to the imaging apparatuses of the second embodiment, but the light source region setting units 501-1 to 501-p can be added to the imaging apparatuses of the first embodiment in order to achieve the same effect as described above.

Fourth Embodiment

Next, the following describes an image capturing apparatus according to the fourth embodiment of the present invention. The fourth embodiment differs from the other embodiments in that an image signal is outputted only in a case that the image is captured in synchronization with the intensity variations of the light from the light source, since all of the imaging apparatuses cannot always capture the light from the light source depending on directions or movements of an object when the light source is equipped on the object.

Figure 10:
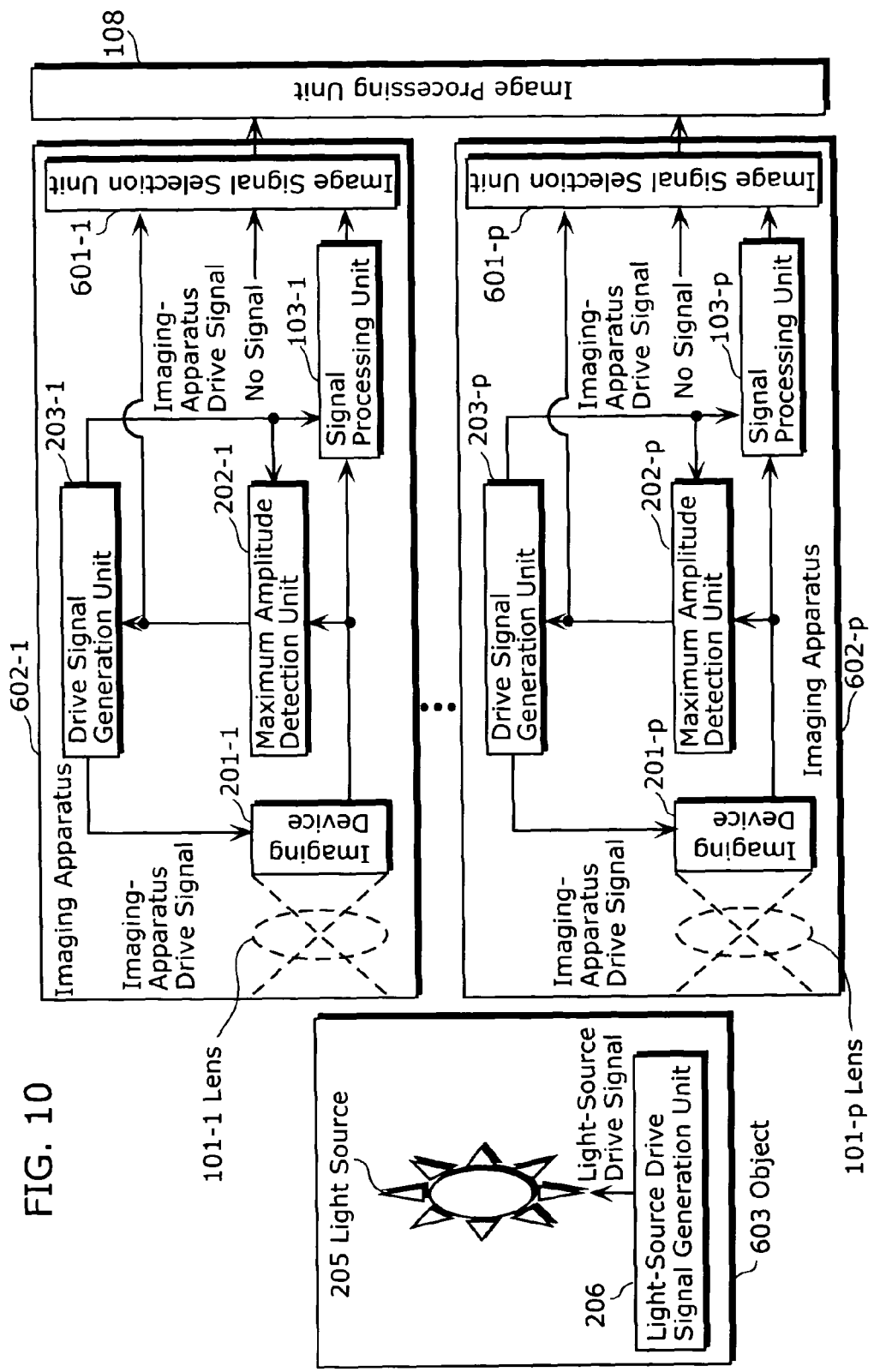
FIG. 10 is a diagram showing a structure of an image capturing apparatus according to the fourth embodiment.

FIG. 10 is a block diagram showing a structure of the image capturing apparatus according to the fourth embodiment. Referring to FIG. 10, an object 603 includes the light source 205 and the light-source drive signal generation unit 206, and the object 603 is to be captured by imaging apparatuses 602-1 to 602-p. Image signal selection units 601-1 to 601-p detect, from phase adjustment signals outputted from the respective maximum amplitude detection units 202-1 to 202-p, respective amounts of phase adjustment for the respective imaging-apparatus drive signals, and in a case that the amounts of phase adjustments are zero, the image signal selection units 601-1 to 601-p select respective image signals which are inputted from the respective signal processing units 103-1 to 103-p, while in a case that the amounts of phase adjustments are not zero, the image signal selection units 601-1 to 601-p select a null signal which is no signal.

The imaging apparatuses 602-1 to 602-p include the lenses 101-1 to 101-p, the imaging devices 201-1 to 201-p, the signal processing units 103-1 to 103-p, the drive signal generation units 203-1 to 203-p, the maximum amplitude detection units 202-1 to 202-p, and the image signal selection units 601-1 to 601-p, respectively.

Note that the lenses 101-1 to 101-p, the imaging devices 201-1 to 201-p, the signal processing units 103-1 to 103-p, the drive signal generation units 203-1 to 203-p, the maximum amplitude detection units 202-1 to 202-p, the image processing unit 108, the light source 205, and the light-source drive signal generation unit 206 are the same units as described in the second embodiment, so that the detail of those units are not described herein below.

Figure 11:
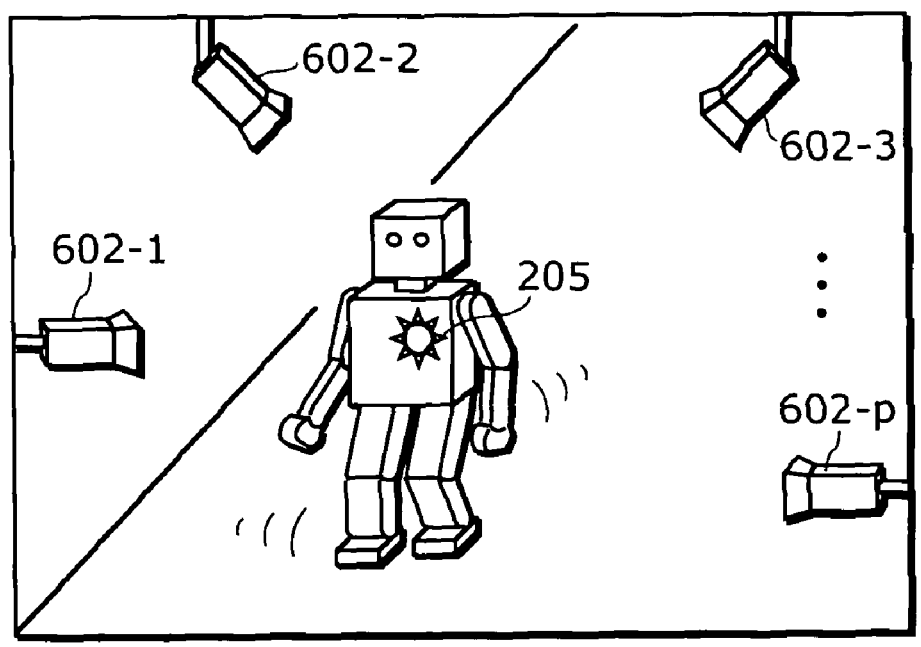
FIG. 11 is a diagram showing an application example of the fourth embodiment.

Note also that, in the fourth embodiment, the light source 205 is equipped on a specific position (a chest, for example) of the object (a robot, for example) as shown in FIG. 11. Therefore, depending on directions or movements of the robot, some of a plurality of the imaging apparatuses 602-1 to 602-p cannot capture the light from the light source 205. In order to solve the problem, in the fourth embodiment, the image signals to be outputted to the image processing unit 108 is limited to image signals which are outputted from imaging apparatuses that can capture images of the object in synchronization with the intensity variations of the light from the light source 205.

The following describes operations of the image capturing apparatus according to the fourth embodiment with reference to FIG. 10. Note that the phase adjustment performed by the imaging apparatuses according to the fourth embodiment is the same as described in the second embodiment, so that the detail of the phase adjustment is not described herein below.

Firstly, each imaging device from 201-1 to 201-p outputs an electrical signal corresponding to light intensity of the light from the light source 205 which is equipped on the object 603, and each maximum amplitude detection unit from 202-1 to 202-p adjusts a phase of each imaging-apparatus drive signal. Here, in a case that a plurality of the imaging apparatuses 602-1 to 602-p are installed in a large area, the phase adjustments are performed in an order from the image apparatuses which can capture images of the object 603 among the imaging apparatuses 602-1 to 602-p.

Next, each maximum amplitude detection unit from 202-1 to 202-p outputs a phase adjustment signal for adjusting a phase of the imaging-apparatus drive signal by using an amplitude of an electrical signal from each imaging device from 201-1 to 201-p, into each drive signal generation unit 203-1 to 201-p and also to each image signal selection unit from 601-1 to 601-p.

Next, each image signal selection unit from 601-1 to 601-p detects, by using the phase adjustment signal, an amount of the phase adjustment fro the imaging-apparatus drive signal. Then, in a case that the amount of phase adjustment is zero, this means that the phase adjustment for the drive signal for each imaging apparatus from 602-1 to 602-p completes, and then the image signal outputted from each signal processing unit 103-1 to 103-p is outputted to the image processing unit 108. On the other hand, in a case that the amount of phase adjustment is not zero, this means that the phase adjustment for the drive signal for each imaging apparatus from 602-1 to 602-p does not complete, and then the null signal is outputted to the image processing unit 108.

Therefore, in a case that a plurality of the imaging apparatuses 602-1 to 602-p are installed, the image signals are outputted, into the image processing unit 108, from some imaging apparatuses from 602-1 to 602-p in which the respective phase adjustment have completed, so that it is possible to process images of the object 603 from the image signals, even if all of the installed imaging apparatuses 602-1 to 602-p have not yet completed the respective phase adjustments.

As described above, the fourth embodiment includes the image signal selection units 601-1 to 601-p which select image signals to be outputted, depending on the amount of phase adjustment, so that it is possible for the imaging apparatuses 602-1 to 602-p to output only image signals whose phase adjustments have completed, which enables to process images which are captured with synchronized timing, even if all of the installed imaging apparatuses 602-1 to 602-p have not yet completed the respective phase adjustments.

Note that, the image capturing apparatus according to the fourth embodiment has been described to have a structure in which the image signal selection units 601-1 to 601-p are added to the image capturing apparatus according to the second embodiment, but the image signal selection units 601-1 to 601-p can be added to the first or the third embodiment to achieve the same effect described in the fourth embodiment.

Although the image capturing apparatus according to the present invention has been described by using the first to the fourth embodiments, the present invention is not limited to these embodiments.

Figure 12:
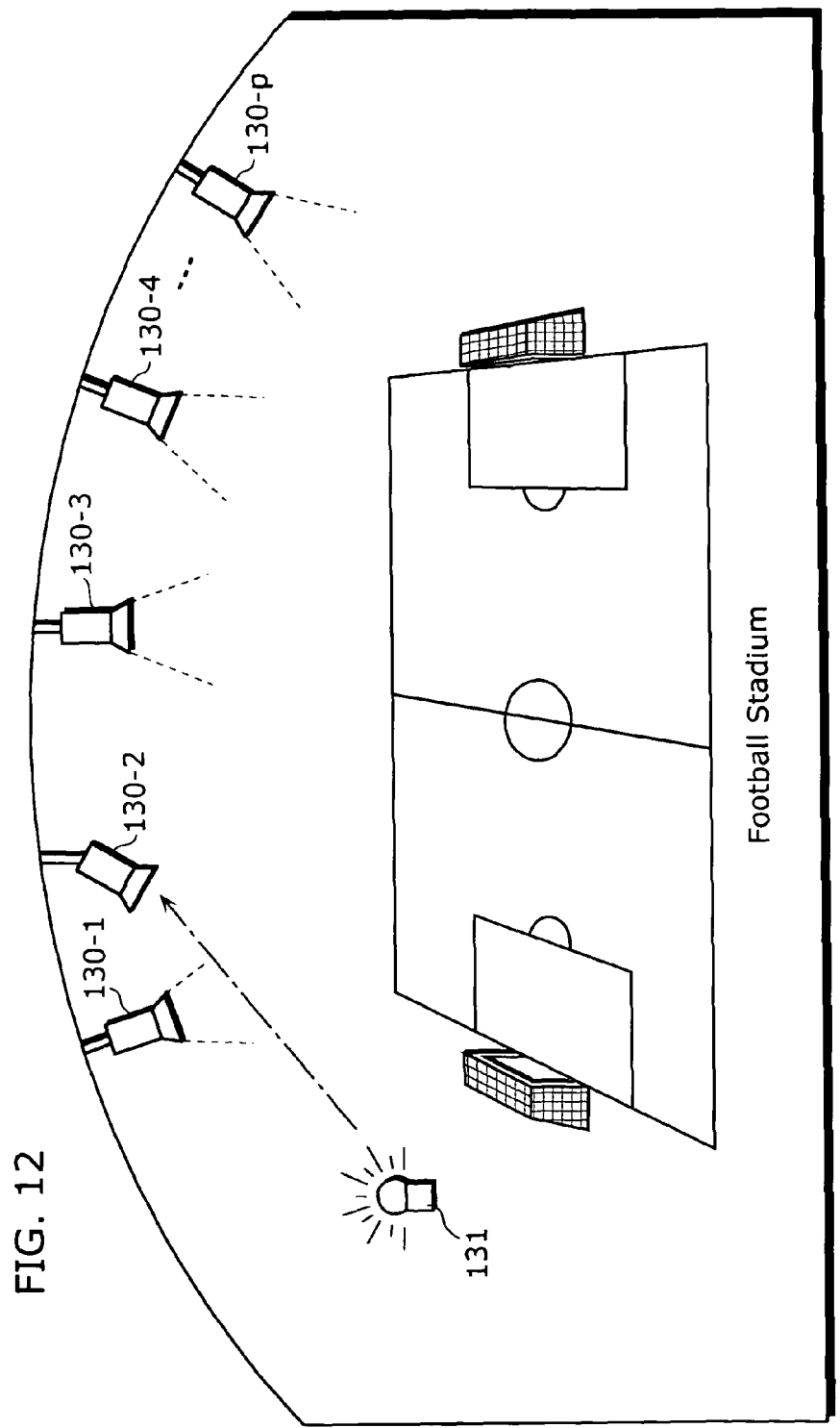
FIG. 12 is a diagram showing one example in which the present invention is applied to capture images of a football stadium.

For example, these embodiments have described that the light source is placed in the same visual field of the object whose images to be captured, but the light source may be placed in a different visual field. For example, as shown in FIG. 12, in a case that the object whose images to be captured is a football stadium, a light source 131 whose light intensity varies in a certain cycle is placed outside the football stadium. Then, every certain time period, or when it is not necessary to capture the football stadium, each imaging apparatus from 130-1 to 130-p changes a capturing direction to capture the light source 131 and performs the synchronization (synchronizes the internal imaging-apparatus drive signal with the intensity variations of the light from the light source and). After the synchronization, each imaging apparatus from 130-1 to 130-p again changes the capturing direction to capture images of the football stadium. Thereby, it is not necessary to place the light source near the object whose images to be captured.

Note that the light source does not always need to vary the light intensity. For example, in the image capturing apparatus shown in FIG. 12, the imaging apparatuses 130-1 and 130-2 capture the light from the light source 131, and only when these apparatuses perform the synchronization, the light source 131 needs to change the light intensity in a certain cycle. Thereby, it is possible to save power consumption for light emission of the light source.

Thus, the phases of the respective drive signals for a plurality of the imaging apparatuses are adjusted by using the light source which varies the light intensity every predetermined time period, so that the present invention can be implemented without a synchronizing signal generation unit which increases a cost, and without a wiring for connecting the plurality of imaging apparatuses with one another which increases an installation cost, and also the present invention enables the plurality of imaging apparatuses to capture images of an object with synchronized timing.

Industrial Applicability

The present invention can be applied to an image capturing apparatus, such as a camcorder, and more specifically to an image capturing apparatus, a video system, and the like, which are suitable to capture, with synchronized timing, images of the same object by using a plurality of the image capturing apparatuses.

The invention claimed is:

1. An image capturing apparatus in a system which comprises a plurality of image capturing apparatuses that capture, with synchronized timing, an image of an object moving in a space where a light source is placed, the light source emitting light whose intensity varies in a predetermined cycle, said imaging capturing apparatus comprising:

a light source detection unit operable to detect the light which is emitted from said light source, and to convert the detected light into an electrical signal;

a drive signal generation unit operable to generate a signal which is synchronized with the electrical signal outputted from said light source detection unit, and to output the generated signal as a drive signal;

an imaging unit operable to capture the image of the object; and a signal processing unit operable to generate, from a signal outputted from said imaging unit, an image signal which includes a picture sequence that is synchronized with the drive signal, wherein said drive signal generation unit includes:

a phase difference detection unit operable to detect a phase difference between the electrical signal outputted from said light source detection unit and the drive signal; and a phase adjustment unit operable to adjust a phase of the drive signal in order to modify the detected phase difference to be a predetermined value.

2. The image capturing apparatus according to claim 1, wherein said light source detection unit and said imaging unit share an imaging sensor.

3. An image capturing apparatus in a system which comprises a plurality of image capturing aaratuses that capture, with synchronized timing, an image of an object moving in a space where a light source is placed, the light source emitting light whose intensity varies in a predetermined cycle, said imaging capturing apparatus comprising:

a light source detection unit operable to detect the light which is emitted from said light source, and to convert the detected light into an electrical signal;

a drive signal generation unit operable to generate a signal which is synchronized with the electrical signal outputted from said light source detection unit, and to output the generated signal as a drive signal;

an imaging unit operable to capture the image of the object; and a signal processing unit operable to generate, from a signal outputted from said imaging unit, an image signal which includes a picture sequence that is synchronized with the drive signal, wherein said drive signal generation unit is operable to generate a signal whose cycle is one K-th, where K is a whole number, of a cycle of the intensity variation of the light emitted from the light source, and to output the generated signal as the drive signal.

4. The image capturing apparatus according to claim 3, wherein said light source detection unit and said imaging unit share an imaging sensor.

5. A method in a system which comprises a plurality of image capturing apparatuses that capture, with synchronized timing, an image of an object moving in a space where a light source is placed, the light source emitting light whose intensity varies in a predetermined cycle, said method comprising:

detecting the light which is emitted from the light source, and converting the detected light into an electrical signal;

generating a signal which is synchronized with the electrical signal outputted by said detecting, and outputting the generated signal as a drive signal;

capturing the image of the object; and generating, from a signal obtained by said capturing, an image signal which includes a picture sequence that is synchronized with the drive signal, wherein said generating the signal which is synchronized with the electrical signal outputted by said detecting comprises:

detecting a phase difference between the electrical signal outputted by said detecting and the drive signal; and adjusting a phase of the drive signal in order to modify the detected phase difference to be a predetermined value.

6. A non-transitory computer-readable medium having a program stored thereon for use in an image capturing apparatus in a system which comprises a plurality of image capturing apparatuses that capture, with synchronized timing, an image of an object moving in a space where a light source is placed, the light source emitting light whose intensity varies in a predetermined cycle, said program causing a computer to execute the processing performed by the method for capturing the image according to claim 5.

7. A method in a system which comprises a plurality of image capturing apparatuses that capture, with synchronized timing, an image of an object moving in a space where a light source is placed, the light source emitting light whose intensity varies in a predetermined cycle, said method comprising:

detecting the light which is emitted from the light source, and converting the detected light into an electrical signal;

generating a signal which is synchronized with the electrical signal outputted by said detecting, and outputting the generated signal as a drive signal;

capturing the image of the object; and generating, from a signal obtained by said capturing, an image signal which includes a picture sequence that is synchronized with the drive signal, wherein said generating the signal which is synchronized with the electrical signal outputted by said detecting comprises generating a signal whose cycle is one K-th, where K is a whole number, of a cycle of the intensity variation of the light emitted from the light source, the generated signal being output as the drive signal.

8. A non-transitory computer-readable medium having a program stored thereon for use in an image capturing apparatus in a system which comprises a plurality of image capturing apparatuses that capture, with synchronized timing, an image of an object moving in a space where a light source is placed, the light source emitting light whose intensity varies in a predetermined cycle, said program causing a computer to execute the processing performed by the method for capturing the image according to claim 7.

* * * * *